United States Patent [19]

Stiles et al.

[11] Patent Number: 4,477,188

[45] Date of Patent: Oct. 16, 1984

[54] MONOLITHIC THREE AXIS RING LASER GYROSCOPE

[75] Inventors: John C. Stiles, Morris Plains; Bo H. G. Ljung, Wayne, both of N.J.

[73] Assignee: The Singer Company, Little Falls, N.J.

[21] Appl. No.: 368,797

[22] Filed: Apr. 16, 1982

[51] Int. Cl.³ .............................................. G01C 19/64
[52] U.S. Cl. ........................................ 356/350; 372/94
[58] Field of Search ........................... 356/350; 372/94

[56] References Cited

U.S. PATENT DOCUMENTS 3,503,688 3/1970 Lechevalier ....................... 356/350
4,407,583 10/1983 Simms ................................ 356/350

Primary Examiner—Vincent P. McGraw
Attorney, Agent, or Firm—Morris Liss; T. W. Kennedy

[57] ABSTRACT

A monolithic ring laser gyroscope is formed by six mirrors mounted to the respective center of each face in a cube. Bores in the cube interconnect each of the mirrors. Three orthogonal planes are defined within the cube, each of which contains a laser cavity. Accordingly, three orthogonal beam paths exist, each responsive to rotational inputs about three orthogonal axes.

3 Claims, 2 Drawing Figures

MONOLITHIC THREE AXIS RING LASER GYROSCOPE

FIELD OF THE INVENTION

The present invention relates to ring laser gyroscopes and more particularly to a monolithic three axis ring laser gyroscope.

BRIEF DESCRIPTION OF THE PRIOR ART

Conventionally, separate ring laser gyroscopes (RLGs) have been used to obtain inertial rotation information in bodyfixed coordinates. The approach utilizing three separate RLGs in an orthogonal mounting has the principal drawback of complexity and bulk.

U.S. Pat. No. 3,503,688 discloses a monolithic RLG in which three single axis RLGs are machined into one quartz block. This design utilizes a triangular RLG configuration wherein a total of nine reflective mirrors are used. Each RLG thus employs three mirrors. The plasma and the gasfill is common for the three RLGs. The monolithic design mentioned is far less bulky but still rather complex in construction due to the large number of mirrors employed.

BRIEF DESCRIPTION OF THE PRESENT INVENTION

The present invention discloses a three axis ring laser gyroscope of monolithic design. The primary purpose of this device is to provide a simple, reliable and cost effective means of sensing inertial rotation about three mutually perpendicular axes. The present invention utilized only six mirrors instead of the nine mirrors required by the patented device.

Further, the present design utilizes only one monolithic body instead of the usual three. With the invention as described, only a single body dither mechanism is necessary, compared to the customary three mechanisms for separate RLGs. The size requirement for the inventive structure is substantially smaller than what would be required with three separate RLGs. Inherently, the present invention offers a more mechanically stable device than may be realized by utilizing individual RLGs.

The benefits derived by the present invention are made possible by utilizing six mirrors, interconnected by bores forming optical cavities. Each cavity includes four mirrors and bores interconnecting the mirrors in coplanar relation. Three mutually orthogonal planes intersect the mirrors so that each mirror lies in two of the three planes. Each plane will include orthogonal segments of a square beampath. Consequently, three orthogonally disposed beampaths, each of a square configuration, sense the three axes of gyro rotation.

The above-mentioned objects and advantages of the present invention will be more clearly understood when considered in conjunction with the accompanying drawings, in which:

DETAILED DESCRIPTION OF THE INVENTION

Figure 1:
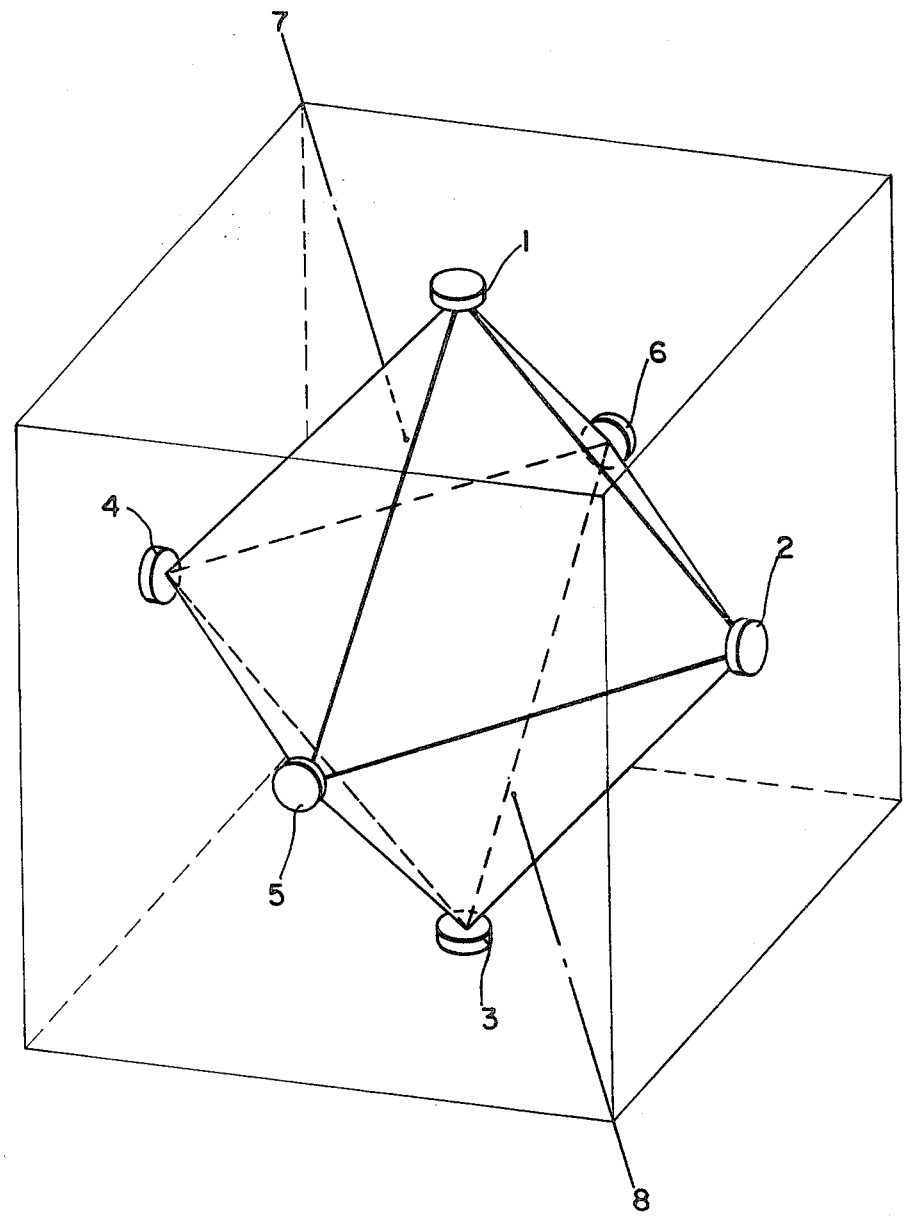
FIG. 1 is a schematic illustration of the monolithic three axis ring laser gyroscope.

Referring to FIG. 1, a schematic illustration of the invention is shown. Mirrors 1–6 are respectively positioned in the center of each cube body face. The cube is machined such that a small diameter bore connects adjacent mirrors as illustrated. A closed optical cavity is defined between four coplanar mirrors which are interconnected by bores. A total of three optical cavities are formed between the mirrors as follows: 2, 5, 4, 6; 1, 5, 3, 6; and 1, 2, 3, 4. The cavity defined by these bores is filled with a helium-neon gas mixture which causes lasing in reponse to electrical excitation to be discussed hereinafter.

In the configuration shown in FIG. 1, there are three mutually orthogonal beam paths, each of which serves to detect angular rotation about a separate axis. These beam paths may be defined by the optical cavities mentioned above between mirrors 2, 5, 4 and 6; 1, 5, 3 and 6; and 1, 2, 3 and 4. FIG. 1 illustrates the fact that each mirror is incorporated in the beam path of two orthogonal planes. Otherwise stated, each mirror is utilized for two orthogonal RLGs respectively associated with two separate axes.

Preliminary calculations indicate that three mirrors are preferably flat while the remaining three are spherical. Alternatively, all six mirrors may be spherical. In a preferred embodiment of the invention, all mirrors have a long radius of curvature, typically 1–10 meters.

With continued reference to FIG. 1, the bores existing between the mirrors define segments of the previously stated beam paths along which laser light travels. As is usual in RLGs, each RLG has laser light propagating in opposite directions. Any frequency difference in these two light waves represents an inertial rotation. In order to avoid the problems of the well-documented lock-in effect, the monolithic laser is dithered about an axis that is equally shared by the three RLGs. Dithering, which is an angular vibration imposed upon the body of the RLG is a well-accepted means of avoiding the lock-in effect. The dither axis of the structure shown in FIG. 1 is indicated between reference numerals 7 and 8.

Figure 2:
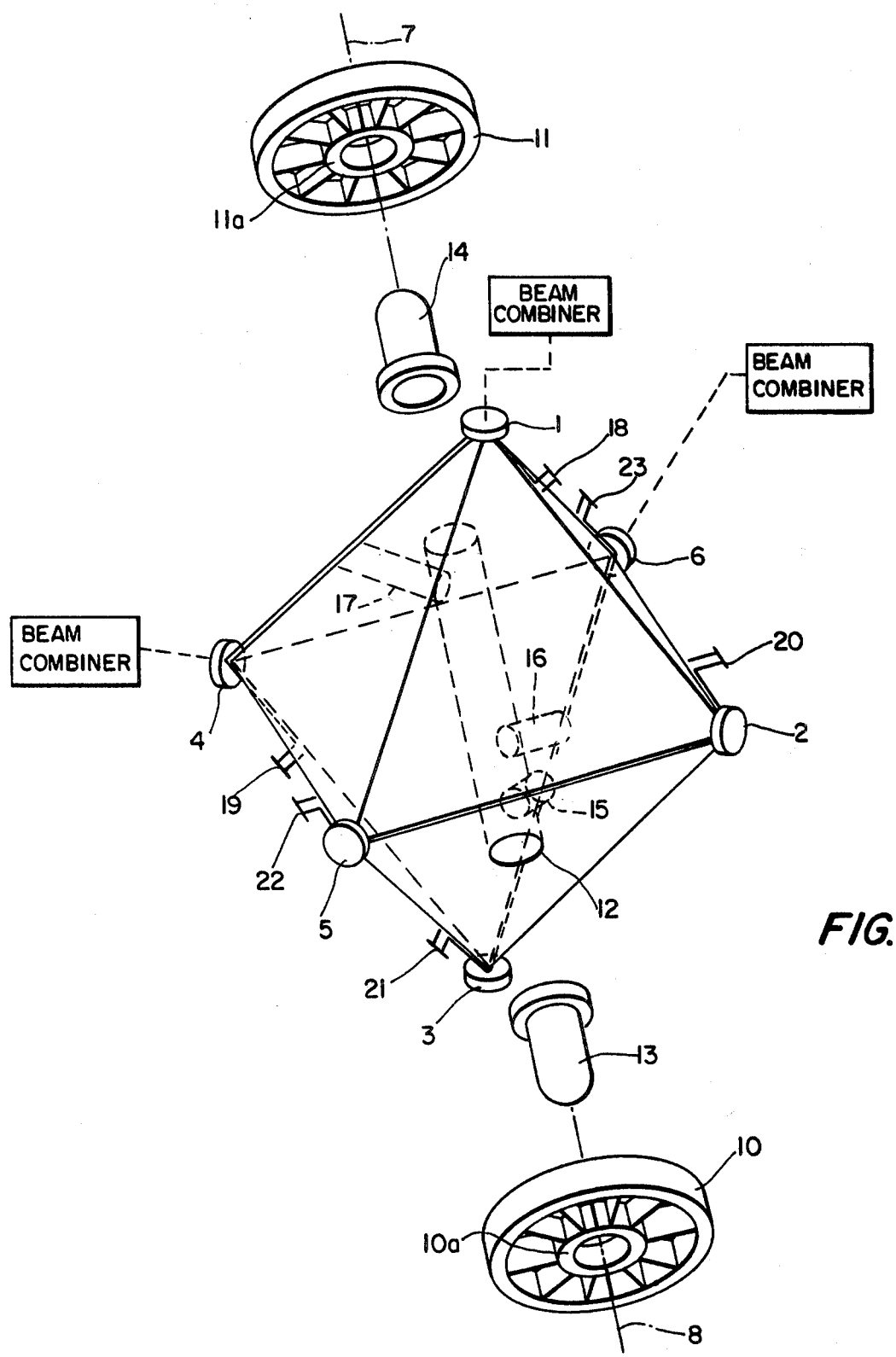
FIG. 2 is a schematic disassembled view of the ring laser gyroscope including anodes, cathodes and spring suspension.

FIG. 2 illustrates how a dither spring suspension may be arranged. Two dither springs 10 and 11 support the monolithic RLG on the axis 7,8. These dither springs are well known in the prior art and incorporate a piezoelectric sensor and motor that is connected with a servo amplifier to dither the cube block about the axis 7, 8. The dithering suspension components are well documented in the prior art and will therefore not be elaborated upon herein. Each RLG portion of the invention, corresponding to one of the three beam paths, senses a large part of the dither angular rotation about the axis 7, 8 to a sufficient degree to prevent the lock-in effect.

Bore 12 is coaxially positioned along axis 7, 8. The cathodes 13 and 14 are fastened to corresponding faces of the cube body and in registry with the openings of bore 12. Alternatively, a single cathode may be located within bore 12. Each of the dither springs 10 and 11 have central annular openings 10a and 11a to facilitate attachment to the cube body. The outer rims of springs 10 and 11 are fixed while the monolithic RLG undergoes dithering motion.

Shortened bores 15, 16 and 17 permit communication between bore 12 and cathodes 13, 14 to each of the three RLG beam paths. Double lines are employed in FIG. 2 to indicate the plasma paths which are symmetrical with respect to the cathode bores 15, 16 and 17.

Anodes for the monolithic RLG are denoted by reference numerals 18–23. The path sections in which the anodes are positioned are preferably symmetrical with both the cathodes (as noted earlier) and the laser mode shape. Otherwise, the Langmuir flow induced bias cannot be balanced. This requirement is facilitated by the use of six mirrors having the same radius.

Each of the three beam paths in the monolithic RLG must be held constant in length to ensure proper operation as is the case with the conventional RLG. This is accomplished by two ways. First, the body of the RLG is fabricated with a low expansion material such as Cervit or Zerodur. Secondly, three of the mirrors, 2, 3 and 5, are made to be movable thereby permitting each beam path to be adjusted in length in accordance with the principles well established by the prior art. This will be explained by viewing the simplified schematic diagram of FIG. 2. For example, were it desirable to shorten the beam path between mirrors 2, 5, 4 and 6; mirrors 2 and 5 would be pushed inwardly by an incremental amount $\delta$ while mirror 3 would be moved outwardly. In a similar manner, the other beam paths may be individually adjusted so that each beam path remains constant in length, despite changes in temperature, acceleration, etc.

In operation of the monolithic RLG, each of the three beam paths 2, 5, 4, 6; 1, 5, 3, 6; and 1, 2, 3, 4 will encompass two counterrotating beams. The beat frequency between these can be measured with a conventional beam combiner attached to mirrors 4, 6 and 1, respectively, as indicated in FIG. 2.

The plasma current in each of the component ring lasers may be individually adjusted by changing the voltage levels on the anodes 18–23, just as individually done in coventional single unit RLGs.

By virtue of the present invention, an improvement in the state of the art may be realized. Fewer parts are necessary which results in a less complicated, less costly and more reliable unit. The invention allows realization of an extremely compact package due to the shared space that the three beam paths occupy. The RLG cube block is mechanically more stable than three individual RLGs, each serving a separate axis.

Even when compared to the prior mentioned patented monolithic RLG, the present invention offers better utilization of available space due to the use of square RLG cavities as opposed to triangular ones. The present configuration also minimizes the required number of mirrors.

It should be understood that the invention is not limited to the exact details of construction shown and described herein for obvious modifications will occur to persons skilled in the art.

We claim:

1. A monolithic ring laser gyroscope for detecting inertial rotation about first and second and third sensing axes disposed in guadrature and having a common intersection point, the gyroscope comprising:
   a cube body having six faces with three axes respectively coaxial with said three sensing axes;
   a plurality of mirrors with each mirror located at the center of each cube body face;
   a plurality of bores formed internally of the body between each mirror and each of four adjacent mirrors thereby forming optical cavities therebetween containing lasing gas;
   three mutually orthogonal planes passing through the mirrors, each plane passing through two of said sensing axes and including an optical cavity enclosing a four-sided closed beam path orthogonal to the other four-sided beam paths;
   a diagonal passageway filled with lasing gas and located in the body and having a diagonal axis extending through the body of the cube and through the intersection point;
   at least one cathode affixed to the body and extending outwardly from an end point of the diagonal passageway;
   torsional spring means having a dither axis and being attached to the body and concentrically receiving the cathode for permitting dithering of the body about the dither axis;
   a pair of anodes located in each beam path;
   shortened passageways filled with lasing gas and connecting the diagonal passageway with each of the beam paths for communicating electrical energy from the cathode to the anodes; and
   beam combining means optically communicating with each beam path for measuring the beat frequency between counter-rotating beams in each path, wherein said diagonal axis is disposed close to a line extending through diagonally opposite corners of said cube for ease of manufacture of the diagonal passageway, and wherein each said shortened passageway has an opening into its respective four-sided beam path, said opening and its pair of beam path anodes being disposed so that the opening is midway between the pair of beam path anodes for forming a symmetrical flow path.

2. The gyroscope of claim 1, wherein said dither axis is coaxial with said diagonal axis for dithering the three symmetrical flow paths about the diagonal axis and for ease of assembly of the torsional spring means.

3. The gyroscope of claim 1, wherein said diagonal axis is disposed at a first angle to the plane including the first and second axes and said diagonal axis is disposed at a second angle to the plane including the first and third axes, and wherein said first angle equals said second angle.

* * * * *